United States Patent
Farrelly et al.

(10) Patent No.: US 7,234,564 B2
(45) Date of Patent: Jun. 26, 2007

(54) HAPTIC CONTROLLER FOR ROAD VEHICLES

(75) Inventors: James Owen Patrick Farrelly, Kenilworth (GB); Simon David Stevens, Birmingham (GB); Andrew Dennis Barton, Coventry (GB)

(73) Assignee: TRW Limited (GB)

( * ) Notice: Subject to any disclaimer, the term of this patent is extended or adjusted under 35 U.S.C. 154(b) by 0 days.

(21) Appl. No.: 11/490,548

(22) Filed: Jul. 21, 2006

(65) Prior Publication Data

US 2006/0259222 A1 Nov. 16, 2006

Related U.S. Application Data

(60) Division of application No. 10/637,035, filed on Aug. 7, 2003, now Pat. No. 7,185,731, which is a continuation of application No. PCT/GB02/00523, filed on Feb. 7, 2002.

(30) Foreign Application Priority Data

Feb. 7, 2001 (GB) ................................. 0103015.4

(51) Int. Cl.
*B62D 5/06* (2006.01)
(52) U.S. Cl. .................... 180/412; 180/413; 180/422; 701/41
(58) Field of Classification Search .............. 180/204, 180/6.2, 404, 412, 413, 419, 422, 443; 701/41
See application file for complete search history.

(56) References Cited

U.S. PATENT DOCUMENTS

| 4,830,127 | A |   | 5/1989 | Ito et al. | |
|---|---|---|---|---|---|
| 5,029,660 | A | * | 7/1991 | Raad et al. | 180/422 |
| 5,135,069 | A | * | 8/1992 | Hattori et al. | 180/422 |
| 5,473,231 | A | * | 12/1995 | McLaughlin et al. | 318/433 |
| 5,684,700 | A |   | 11/1997 | Crocker | |
| 6,107,767 | A | * | 8/2000 | Lu et al. | 318/561 |

(Continued)

FOREIGN PATENT DOCUMENTS

JP 200128004 5/2000

*Primary Examiner*—Paul N. Dickson
*Assistant Examiner*—Toan C. To
(74) *Attorney, Agent, or Firm*—MacMillan, Sobanski & Todd, LLC

(57) ABSTRACT

An electric assisted steering system for a motor driven road vehicle, having assist torque signal generating means which generates an assist torque signal for the steering system in response to the driver's applied torque and sensed vehicle speed to reduce the driver's steering effort. A yaw rate haptic torque is generated which is based upon vehicle rate error and is arranged to be added to the torque assist signal such that, when the yaw rate error builds up corresponding to increasing steering instability (e.g. understeer or oversteer) of the vehicle, the haptic torque added to the torque assist signal reduces the effective road reaction feedback sensed by the driver in advance of any actual vehicle stability loss whereby to allow the driver to correct appropriately in good time before terminal steering instability is reached. Alternatively, the haptic torque can be based upon vehicle lateral acceleration which is arranged to be subtracted from the torque assist signal such that when vehicle lateral acceleration builds up, corresponding to tighter cornering of the vehicle, the haptic torque subtracted from the torque assist signal increases the effective road reaction feedback sensed by the driver corresponding to the increase in cornering forces generated by the tires of the vehicle.

15 Claims, 7 Drawing Sheets

U.S. PATENT DOCUMENTS

| | | | |
|---|---|---|---|
| 6,338,015 B1 * | 1/2002 | Kawagoe et al. | 701/41 |
| 6,338,022 B1 * | 1/2002 | Shinmura et al. | 701/301 |
| 6,422,335 B1 * | 7/2002 | Miller | 180/446 |
| 6,496,762 B2 * | 12/2002 | Kurishige et al. | 701/41 |
| 6,556,911 B2 * | 4/2003 | Matsuno | 701/80 |
| 6,895,317 B2 * | 5/2005 | Yasui et al. | 701/36 |
| 6,895,318 B1 * | 5/2005 | Barton et al. | 701/42 |
| 6,925,371 B2 * | 8/2005 | Yasui et al. | 701/72 |
| 6,931,313 B2 * | 8/2005 | Kato et al. | 701/41 |
| 6,968,920 B2 * | 11/2005 | Barton et al. | 180/446 |
| 7,062,382 B2 * | 6/2006 | Courtenay et al. | 701/301 |
| 7,070,247 B2 * | 7/2006 | Offerle | 303/146 |
| 2004/0107032 A1 | 6/2004 | Farrelly et al. | |

* cited by examiner

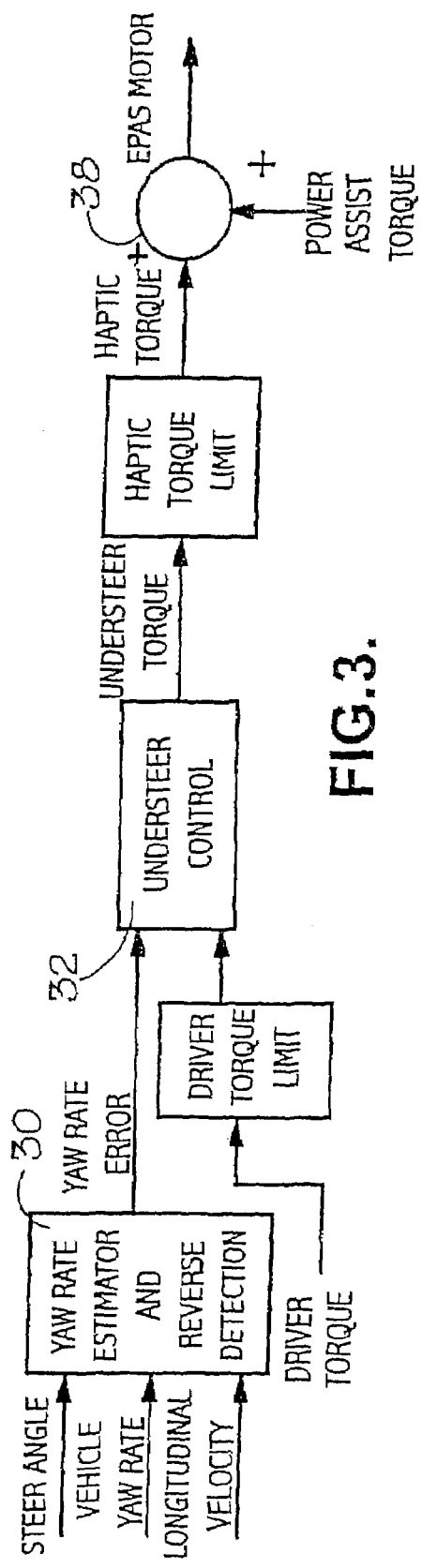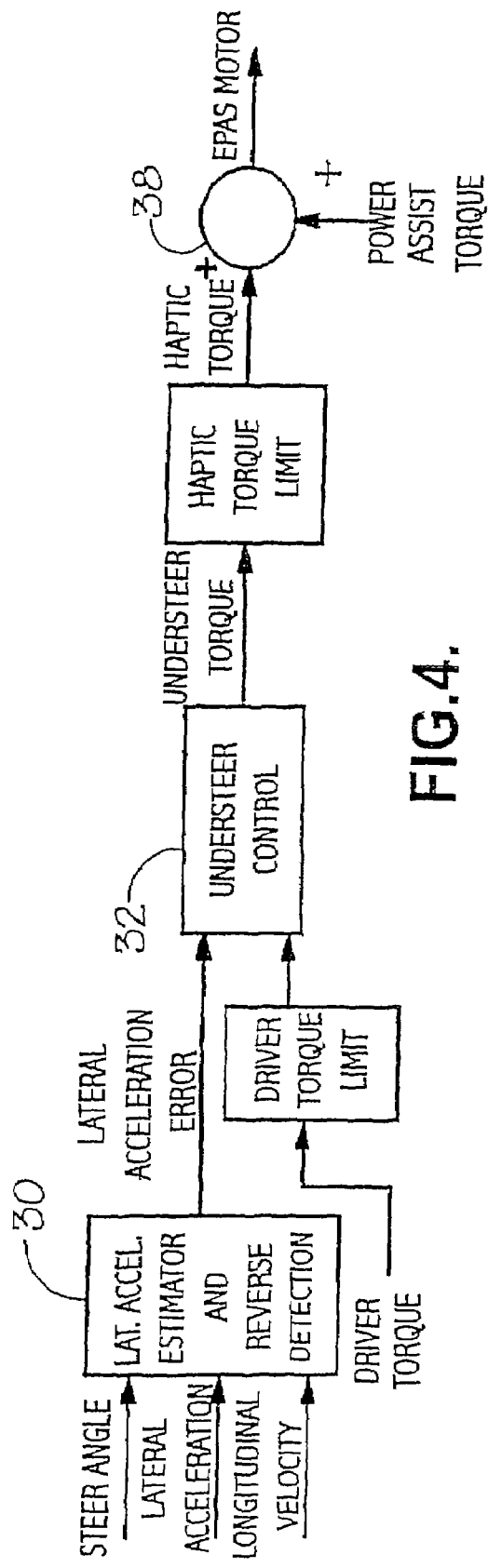
FIG.3.
FIG.4.

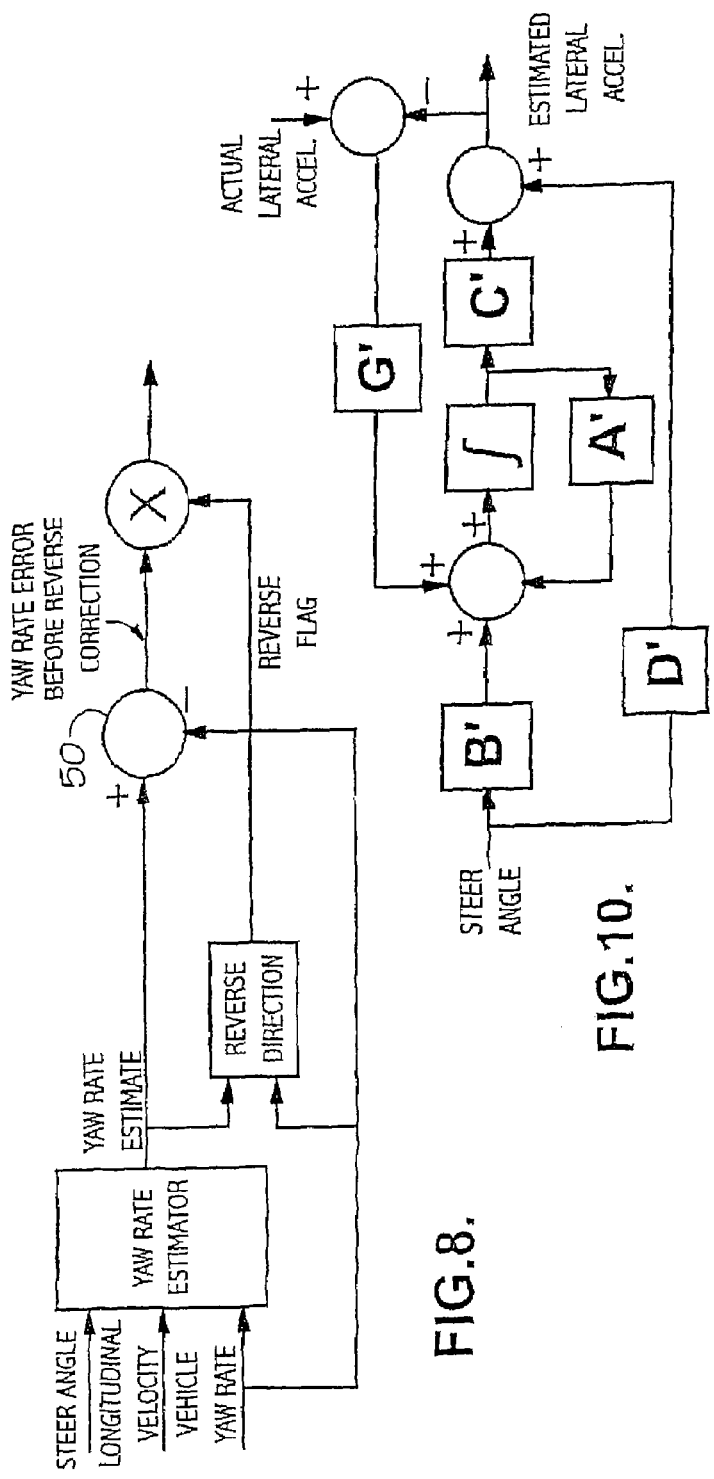
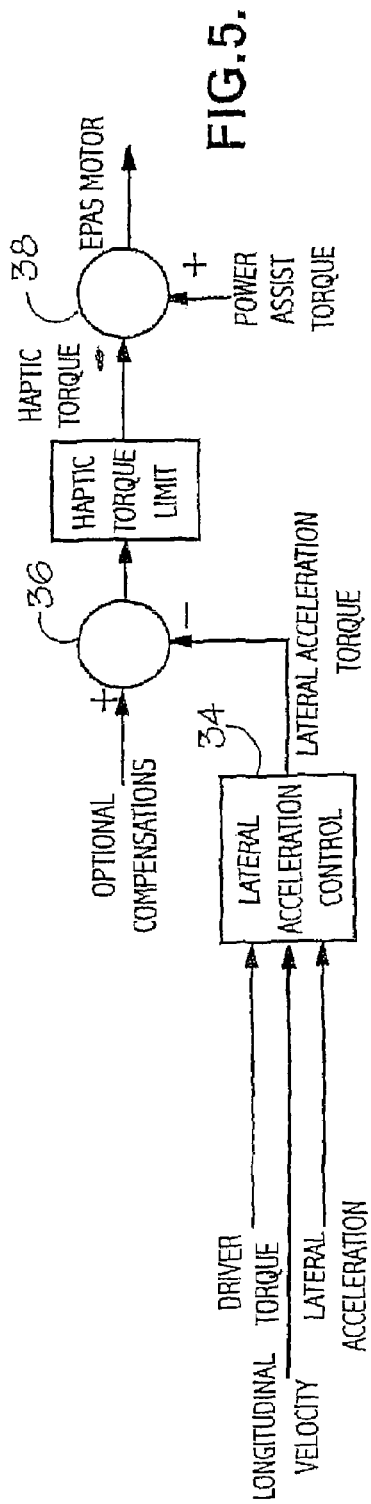
FIG. 8.
FIG. 10.
FIG. 5.

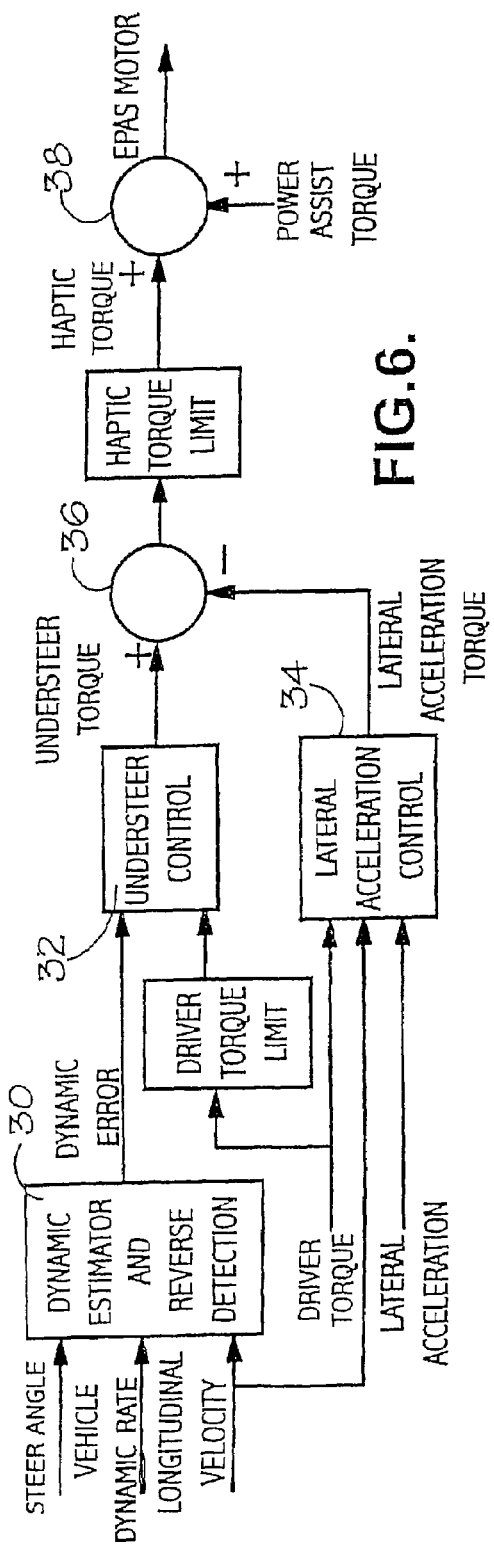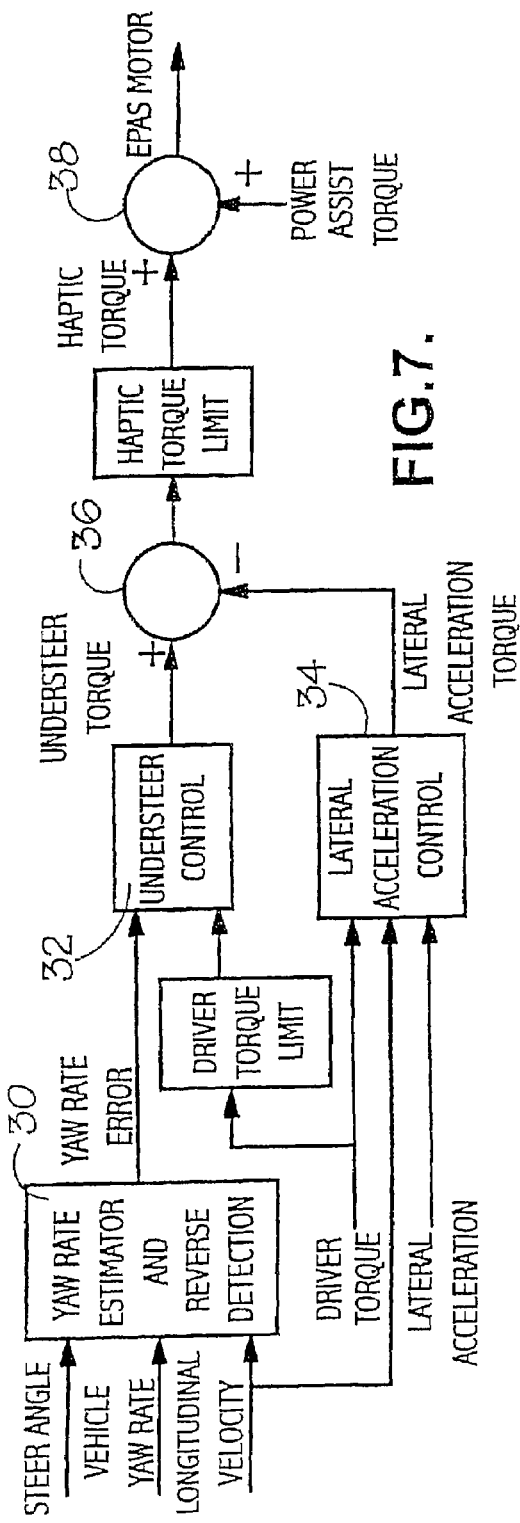

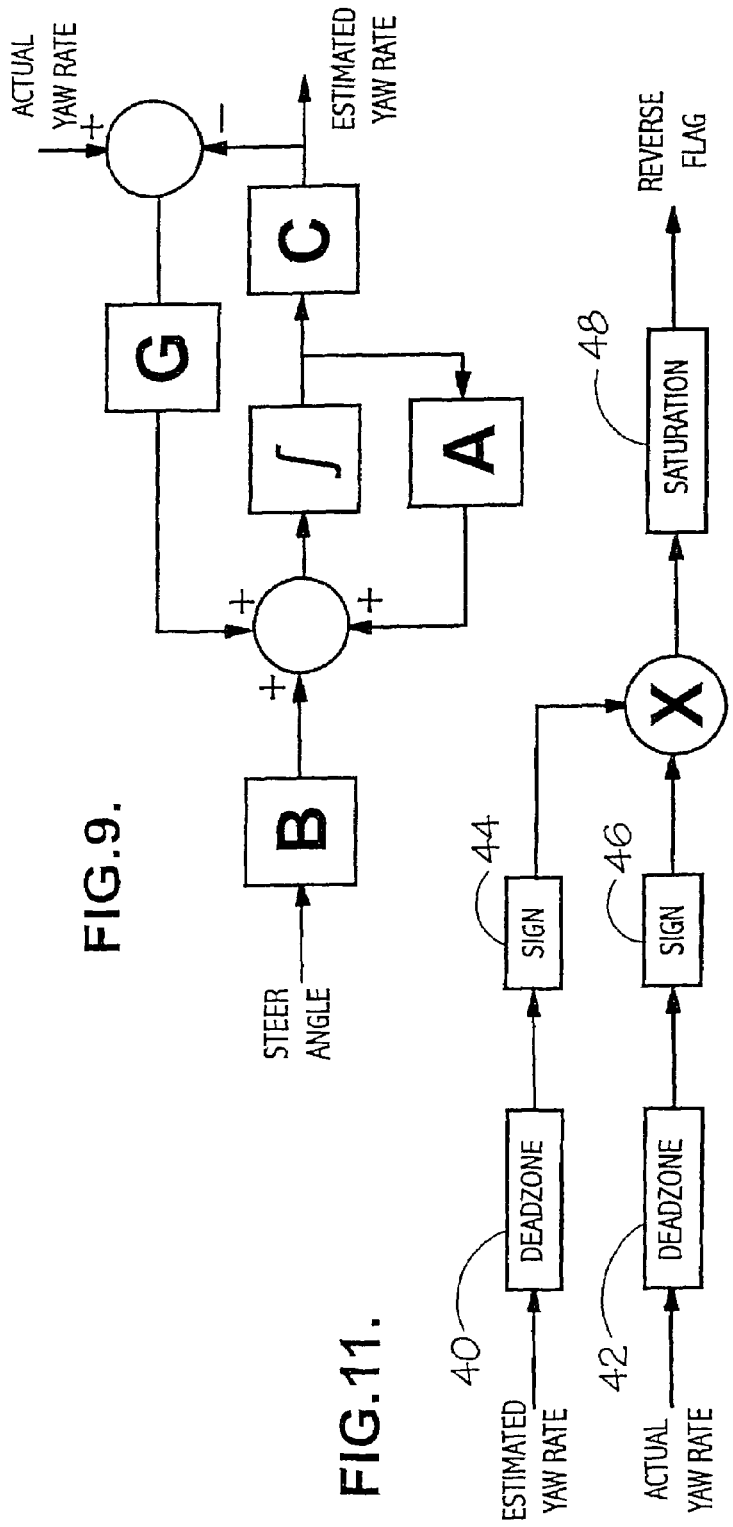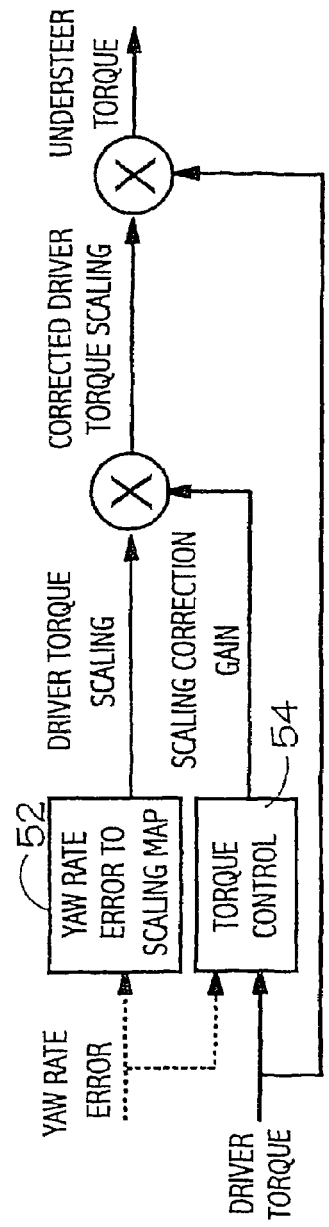

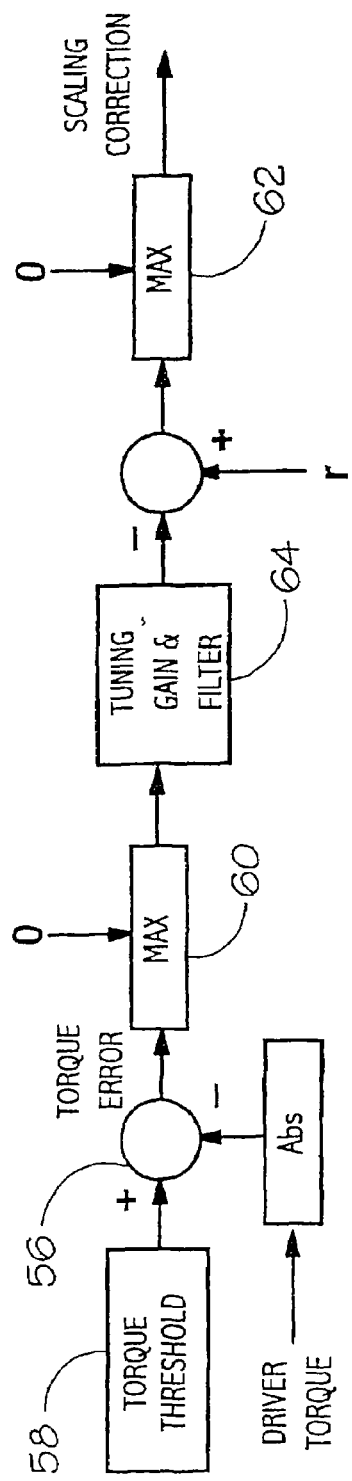
FIG. 14.
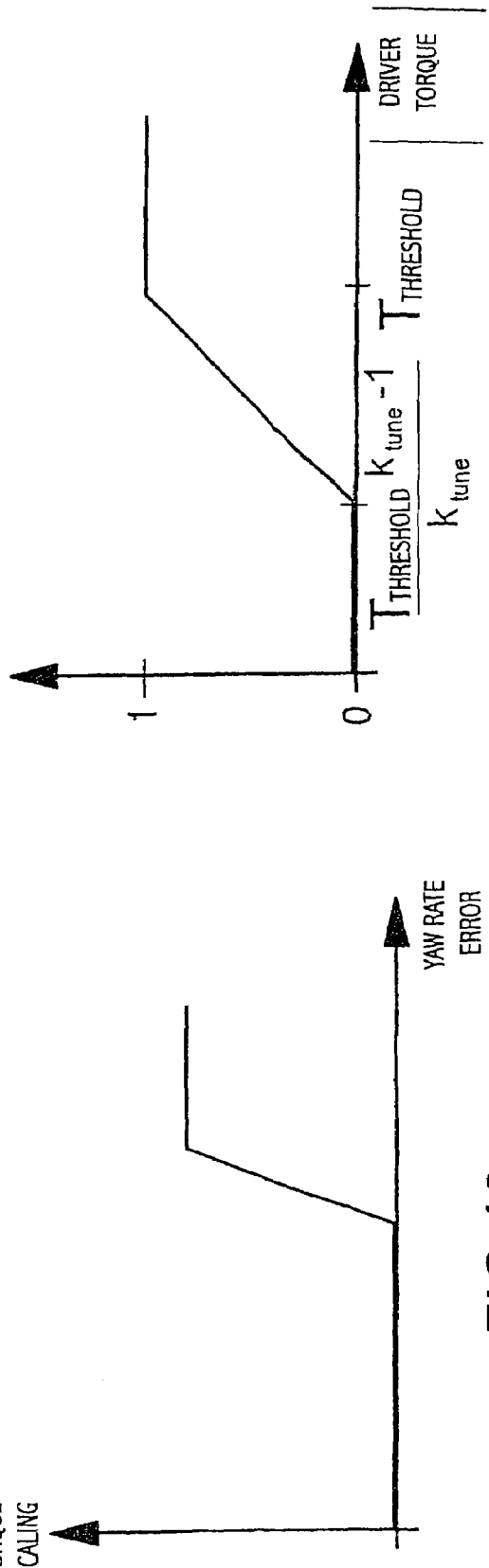
FIG. 15.
FIG. 13.

HAPTIC CONTROLLER FOR ROAD VEHICLES

CROSS-REFERENCE TO RELATED APPLICATIONS

This application is a Divisional patent application of U.S. application Ser. No. 10/637,035 filed Aug. 7, 2003, now U.S. Pat. No. 7,185,731 which is a continuation of International Application No. PCT/GB02/00523 filed Feb. 7, 2002, the disclosures of which are incorporated herein by reference, which claimed priority to Great Britain Patent Application No. 0103015.4 filed Feb. 7, 2001, the disclosures of which are incorporated herein by reference.

BACKGROUND OF THE INVENTION

The present invention relates to electric assisted steering systems (EAS) in motor driven road vehicles and is concerned in particular with a control system in a road vehicle adapted to provide steering torque compensation or haptic torque based on the measured vehicle dynamics, such as yaw rate or lateral acceleration.

Electric assist steering systems are well known in the art. Electric assist steering systems that use, for example, a rack and pinion gear set to couple the steering column to the steered axle, provide power assist by using an electric motor to either apply rotary force to a steering shaft connected to a pinion gear, or apply linear force to a steering member having the rack teeth thereon. The electric motor in such systems is typically controlled in response to (a) a driver's applied torque to the vehicle steering wheel, and (b) sensed vehicle speed.

Other known electric assist steering systems include electro-hydraulic systems in which the power assist is provided by hydraulic means under at least partial control of an electrical or electronic control system.

There is a desire, at least in certain vehicle market segments, to provide the driver with information about the dynamic state of the vehicle via the steering wheel torque. The effects that are most common are an increase in driver torque as the lateral acceleration on the vehicle increases (the handwheel seems to become heavier), and a sudden drop in driver torque (the handwheel seems to become much lighter) when the vehicle reaches terminal understeer. (Terminal understeer is considered to be when an increase in handwheel angle, no longer gives an increase in vehicle yaw rate.) Traditionally these effects have been produced by careful design of the steering system, but modern power assisted steering systems, and space and other compromises in the design of steering systems, has lead to the effects becoming much less noticeable. However, there is a general perception that these effects improve the handling of a vehicle, and therefore they can be quite important in certain market segments.

SUMMARY OF THE INVENTION

It is an object of the present invention to improve the haptic information that the driver receives from the steering system and to provide an algorithm using information already contained in the car about the dynamic state of the car, to artificially recreate the steering feel properties described above.

In its broadest scope, the invention is concerned with a control algorithm that uses signals from motion sensors to adjust the assist torque provided by a power assisted steering system in such a way that information about the dynamic state can be gleaned from the feel of the steering. In one embodiment, the algorithm recreates the increase in driver (handwheel) torque felt by a driver in proportion to lateral acceleration, and in another embodiment the decrease in driver torque when the vehicle enters terminal understeer.

In accordance with a first aspect of the present invention, there is provided a power assisted steering system for a motor driven road vehicle, the system including assist torque signal generating means arranged to generate an assist torque signal for the steering system in response to the driver's applied torque and sensed vehicle speed and effective to reduce the driver's steering effort, and a means for generating a haptic torque based upon vehicle yaw rate error which is arranged to be added to the torque assist signal such that when the yaw rate error builds up, corresponding to increasing steering instability of the vehicle, the haptic torque added to the torque assist signal reduces the effective road reaction feedback sensed by the driver in advance of any actual vehicle stability loss whereby to allow the driver to correct appropriately in good time before terminal steering instability is reached.

Such a system has the advantage of drawing steering instability conditions (e.g. understeer or oversteer) to the attention of the driver.

Preferably, the assist torque signal generating means comprises an electric motor.

Yaw rate error can be established by comparing an estimated yaw rate derived from measured values of steering angle and vehicle longitudinal velocity, with measured vehicle yaw rate.

Preferably, the yaw rate error is saturated, if necessary, to prevent excessive demand and scaled by a gain map.

The gain is preferably controlled in accordance with yaw rate error, such that a low yaw rate error results in a relatively low gain and a high yaw rate error results in a relatively large gain so as to increase the assist torque from the power steering and make the steering feel light to the driver.

In some embodiments, a plurality of gain maps are provided, the most suitable to comply with the prevailing conditions being arranged to be selected automatically from a judgement of road surface conditions based on measured data, such as measured yaw rate error and column torque.

The haptic torque is preferably established by scaling the steering column torque using the scaled yaw rate error, the haptic torque being added to the torque assist to provide an output for driving the electric motor.

A dynamic yaw rate error signal can be derived from a dynamic yaw rate estimation; a functionally equivalent lateral acceleration error signal can also be derived from an equivalent dynamic lateral acceleration estimator.

Thus, in accordance with a second aspect of the present invention, there is provided a power assisted steering system for a motor driven vehicle, the system including assist torque signal generating means arranged to generate an assist torque signal for the steering system in response to the driver's applied torque and sensed vehicle speed and effective to decrease the driver's steering effort, and a means for generating a haptic torque based on vehicle lateral acceleration which is arranged to be subtracted from the torque assist signal such that when vehicle lateral acceleration builds up, corresponding to tighter cornering of the vehicle, the haptic torque subtracted from the torque assist signal increases the effective road reaction feedback sensed by the driver corresponding to the increase in cornering forces generated by the tyres of the vehicle.

This latter arrangement enables the controller to be further tuned to give a heavier steering feel up to the point of understeer followed by a lowering in column torque once impending understeer has been determined.

In accordance with a third aspect of the present invention there is provided a power assisted steering system for a motor driven road vehicle, the system including assist torque signal generating means arranged to generate an assist torque signal for the steering system in response to the driver's applied torque and sensed vehicle speed and effective to reduce the driver's steering effort, and a means for generating a haptic torque based upon vehicle lateral acceleration error which is arranged to be added to the torque assist signal such that when the lateral acceleration error builds up, corresponding to increasing steering instability of the vehicle, the haptic torque added to the torque assist signal reduces the effective road reaction feedback sensed by the driver in advance of any actual vehicle stability loss whereby to allow the driver to correct appropriately in good time before terminal steering instability is reached.

In accordance with a fourth aspect of the present invention, there is provided a power assisted steering system for a motor driven road vehicle, the system including assist torque signal generating means arranged to generate an assist torque signal for the steering system in response to the driver's applied torque and sensed vehicle speed and effective to reduce the driver's steering effort, and a means for generating a haptic torque based either upon (a) vehicle yaw rate error or (b) lateral acceleration error which is arranged to be added to the torque assist signal such that when said error builds up, corresponding to increasing steering instability of the vehicle, the haptic torque added to the torque assist signal reduces the effective road reaction feedback sensed by the driver in advance of any actual vehicle stability loss whereby to allow the driver to correct appropriately in good time before terminal steering instability is reached.

In the latter case, therefore, the overall control method is the same for providing the haptic torque but that the pre-processing part of the method optionally takes either yaw rate or lateral acceleration as the controlling input and where the use of lateral acceleration additionally provides further benefits in providing a haptic torque up to the point of impending understeer.

BRIEF DESCRIPTION OF THE DRAWINGS

FIG. 3 illustrates a derivative function of the steady state controller of FIG. 1;

FIG. 4 substitutes lateral acceleration for yaw rate;

FIG. 5 illustrates the provision of a modifying torque based on lateral acceleration;

FIG. 6 is a block diagram illustrating a further embodiment of a control system in accordance with the present invention;

FIG. 7 is a block diagram illustrating a further embodiment of a control system in accordance with the present invention;

FIG. 8 illustrates yaw rate estimation and reverse detection;

FIG. 9 is a block diagram of a yaw rate estimator;

FIG. 10 is a block diagram of a lateral acceleration estimator;

FIG. 11 is a block diagram illustrating reverse detection;

FIG. 12 is a block diagram illustrating understeer control;

FIG. 13 illustrates a yaw rate error to driver torque scaling look-up table;

FIG. 14 is a block diagram of a torque control section;

FIG. 15 illustrates scaling correction shape;

DETAILED DESCRIPTION OF THE PREFERRED EMBODIMENT

Figure 1:
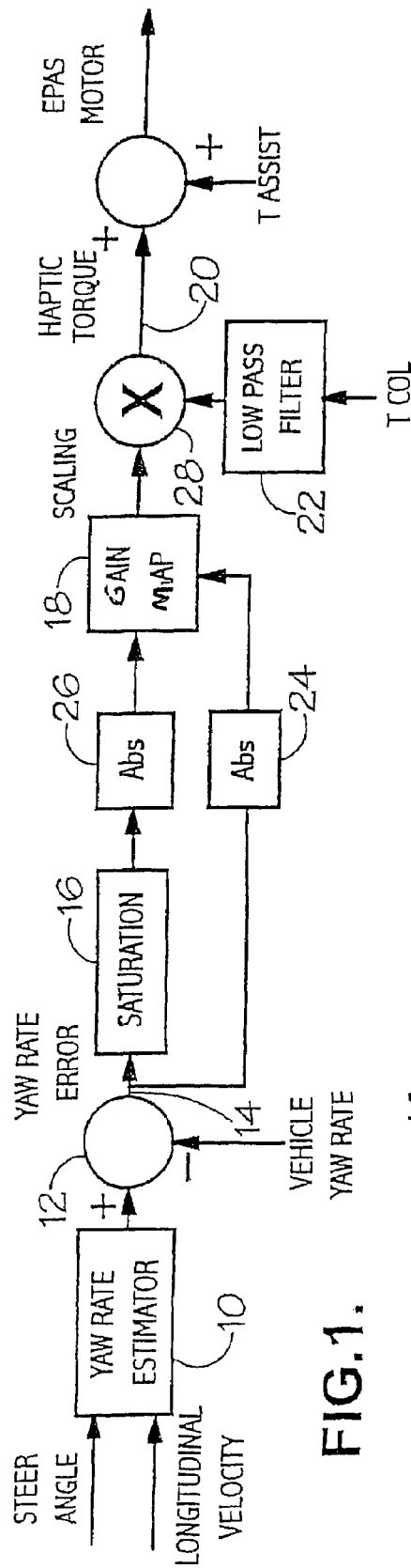
FIG. 1 is a is a block diagram illustrating one embodiment of a control system in accordance with the present invention.

Referring first to FIG. 1, the vehicle steer angle and longitudinal velocity are input to element 10 where an estimate is established of the yaw rate demanded by the driver of the vehicle. The yaw rate estimation is based for example on the steady state understeer equation, expressed as:

$$\hat{r} = \frac{V_x}{l(1 + (V_x/V_{ch})^2)} \frac{\delta_{sw}}{G_s}$$

where $V_x$ is the vehicle longitudinal velocity, $l$ is the wheel base, $V_{ch}$ is the vehicle characteristic speed, $\delta_{sw}$ is the handwheel angle and $G_s$ is the gain of the steering system from road wheels to handwheel. This estimated value is then passed through a first order low pass filter, tuned to give the estimate similar lag to the vehicle. Careful selection of the break point in this filter allows the point where the steering goes light, in relation to the loss of steer authority to be controlled.

The resulting estimated yaw rate is compared at 12 with a signal representative of the actual vehicle yaw rate, as measured by a Vehicle Stability Controller (VSC) or similar sensor, to generate a yaw rate error signal on line 14. The yaw rate error is then saturated at 16 to prevent excessive demand and scaled by a gain map 18.

The saturation block 16 prevents the yaw rate error from reaching too high a level. Experience has shown that if the yaw error is allowed to increase too much, then this can excite an instability in the EAS system. This may be dependent to some extent on the particular characteristics of the EAS system fitted to the vehicle, but the saturation also prevents the system producing excessive torques in the event of an error. It may be necessary sometimes to tune the value of this saturation in dependence upon the surface that the vehicle is on. A possibility is to use column torque and yaw rate error as indices into a look-up table.

The gain at 18 is varied in accordance with the yaw rate error. A low yaw rate error indicates the linear regime referred to above in which the vehicle is operating at constant forward speed and before terminal understeer is reached, and where therefore a low gain is required. On the other hand, a high yaw rate error is indicative of excessive understeer, and therefore a large gain is required to increase the assist torque from the power steering and make the steering feel light.

The haptic torque on line 20 is established by using the scaled yaw rate error signal from the gain map 18 to scale at 28, the column torque (Tcol) which has been low pass filtered at 22 to prevent exciting unstable modes in the power steering. By scaling the column torque at 28, rather than adding to it, the controller is prevented from entering a region where it may attempt to drive the steering system against the driver. In this manner, the inherent self-centring of the steering is maintained. If the driver releases the steering wheel, then the column torque falls to zero, and the haptic torque also falls to zero.

The output from the controller is thus determined by multiplying at 28 the column torque (Tcol) with the output from the gain map 18. As described above, the column torque is low pass filtered at 22, again to prevent excitation of the EAS unstable modes. Careful design of this filter 22 may show that is possible to guarantee stability and allow the removal of the saturation element 16. The result of the multiplication at 28 is then added to the assist torque (Tassist) generated from the power steering controller, and fed to the power steering (EAS) motor.

The "Abs" blocks 24 and 26 in FIG. 1 are included so that the absolute values, or magnitudes, of the input signals are taken.

The yaw rate error in the arrangement of FIG. 1 is scaled by a gain map at 18 in establishing the final output from the controller. The gain value is dependent on the value of the yaw rate error and also on the characteristics of the surface on which the vehicle is running, ie. high Mu or low Mu.

Figure 2:
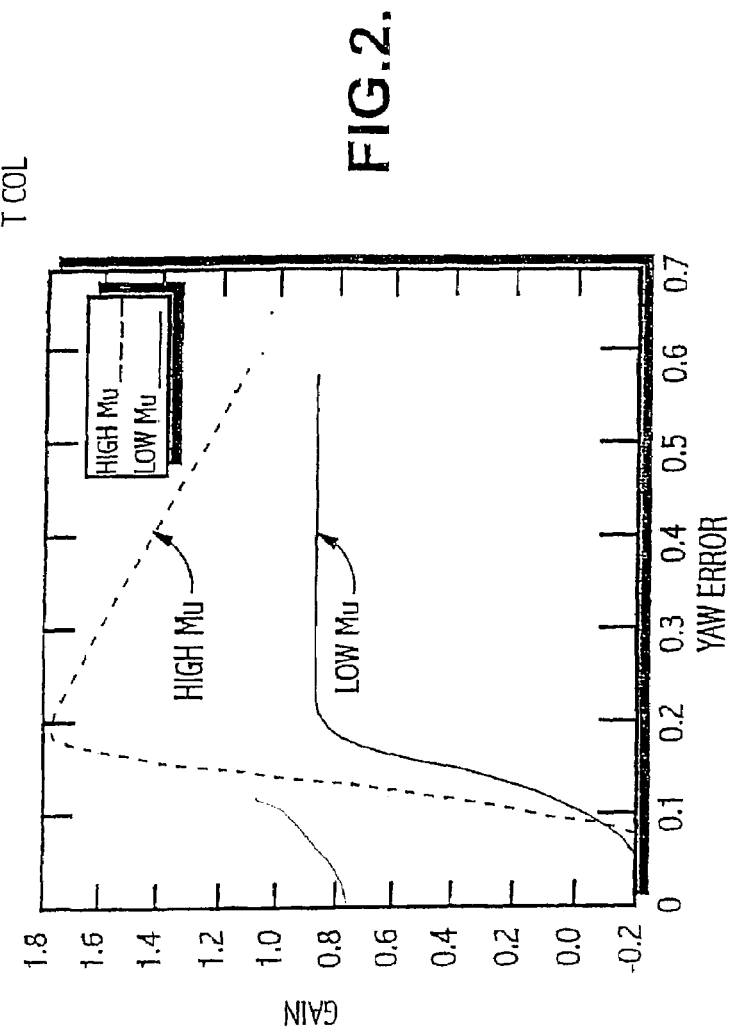
FIG. 2 is a shows examples of controller gain maps that can be used in the present invention.

An example of a controller gain map which can be used is shown in FIG. 2. For low yaw rate error, the scaling is negative, therefore reducing the assist torque and making the steering feel slightly heavier. The aim is to produce a torque that increases with handwheel angle. For high yaw rate errors, the gain is much higher, giving a large positive output that greatly increases the assist torque and makes the handwheel feel light. The shape of these maps can be varied to produce the desired feel in the steering system.

A single map can be used or, preferably, a plurality of maps can be available, the most suitable of which to suit the prevailing circumstances can be selected automatically from a judgement of road surface conditions based, for example, on the measured yaw moment error and column torque, or on tyre slip or video detection routines.

Improvement in the haptic information that the driver receives is provided in the above described system by altering the torque in the steering column in two ways. In the broadly linear operating region at constant forward speed and before terminal understeer is reached, the torque in the steering column is gradually increased as the handwheel angle is increased. This provides the driver with a haptic indication via the handwheel of the amount of lateral acceleration on the vehicle. When terminal understeer is reached such that additional handwheel angle fails to increase the vehicle yaw rate, the torque in the steering column is greatly reduced. This causes the handwheel to become very light, providing the driver with an indication that the limit of traction has been reached. Tuning of the controller allows this drop in torque to happen slightly ahead of the actual loss of traction, providing the driver with a short but usable response time before steer authority is lost.

Traditional power steering systems attempt to control the torque applied by the driver to within limits. This can easily lead to a system where there are none of the haptic features described above and may have little or no change in torque with vehicle dynamic state. The design of the steering geometry also has a significant effect on the feel of the steering. If the geometry is such that there is no build up of steering torque, or drop in torque once the limit is reached, then no simple power steering system will be able to put that feel back. The present system considers what yaw rate the driver is demanding and the actual yaw rate of the vehicle to determine what the torque in the steering system should be.

The assist torque generated by the power steering system is then adjusted accordingly. The proposed system therefore produces steering feel which is independent of the power steering system and the steering geometry.

Referring now to FIG. 3 there is shown a further development of the first aspect of the invention illustrated in FIG. 1, essentially being a derivative function of the steady state controller of FIG. 1 and providing dynamic understeer haptic torque based on yaw rate estimation. In the controller of FIG. 3, use is again made of steer angle and longitudinal velocity as in the first aspect but there is further included a dynamic component, in this case yaw rate. The resulting output provides a yaw rate error which when corrected or scaled against driver torque provides a haptic torque, which is optionally limited, for addition to the power assist torque generated by the power assist system.

Referring next to FIG. 4 there is shown an alternative development, similar to FIG. 3, but which substitutes lateral acceleration for yaw rate, thereby providing dynamic understeer haptic torque based on lateral acceleration estimation. In the controller of FIG. 4, use is again made of steer angle and longitudinal velocity but there is included the further dynamic component of lateral acceleration instead of yaw rate. The resulting output provides a lateral acceleration error which when corrected or scaled against driver torque provides a haptic torque, which is optionally limited, for addition to the power assist torque generated by the power assist system.

FIG. 5 illustrates the provision of a modifying torque based upon lateral acceleration to give a haptic response as lateral acceleration (and hence cornering force) increases up to the point of impending understeer.

FIG. 6 illustrates an arrangement for providing haptic torque based on any of the arrangements of FIGS. 1, 3 or 4 and including lateral acceleration feedback as shown in FIG. 5. This illustrates the overall system where a haptic torque based upon lateral acceleration can be used to provide a dynamic response up to the point of impending understeer and where a dynamic function, such as yaw rate or lateral acceleration can be further added to provide an additional response at the point of impending understeer.

In the embodiment of FIG. 7, the dynamic function is yaw rate and the dynamic error is therefore yaw rate error. The yaw rate estimator 30 uses vehicle state information to calculate the yaw rate that the driver is demanding based on the assumption that the vehicle is linear. This is then passed to the understeer control 32, which calculates a correction to the assist torque being generated by the steering system. In addition, the lateral acceleration block 34 uses a lateral acceleration signal to calculate a separate torque correction signal. The difference between these two correction signals at 36 becomes the Haptic (feel) torque which is added to the steering system assist torque at 38.

Yaw Rate Estimator and Reverse Detection

There are a number of ways in which the yaw rate or lateral acceleration of the vehicle can be estimated. Steady state estimation is the simplest, but has been found to be unreliable at low vehicle speeds. Dynamic estimation is more complicated, but to date, no insurmountable problems have been encountered. The final solution is to use information from within the VSC. One further possible solution is to use lateral acceleration instead of yaw rate, as described in the last paragraph. At the same time as the yaw rate or lateral acceleration is being estimated, a check is made to detect whether the vehicle is reversing. If the vehicle is reversing, then the yaw rate error or lateral acceleration error is set to zero. This prevents the understeer controller affecting the steering feel while the vehicle is reversing which may be confusing for the driver. Yaw rate estimation and reverse detection is illustrated in FIG. 8.

Yaw Rate Estimator—Steady State Estimation

As described hereinbefore, yaw rate estimation can be based on the steady state understeer equation;

$$\hat{r} = \frac{V_x}{l(1 + (V_x/V_{ch})^2)} \frac{\delta_{sw}}{G_s}$$

where $V_x$ is the vehicle longitudinal velocity, l is the wheel base, $V_{ch}$ is the vehicle characteristic speed, $\delta_{sw}$ is the handwheel angle and $G_s$ is the gain of the steering system from road wheels to handwheel. This estimated value is then passed through a first order low pass filter, tuned to give the estimate similar lag to the vehicle. Careful selection of the break point in this filter allows the point where the steering goes light in relation to the loss of steer authority to be controlled.

Experience with this method has highlighted a number of undesirable features. The estimator breaks down at low speed causing the controller to activate in "parking" type manoeuvres where it is highly undesirable. Also the performance of the estimator does not reflect changes in the vehicle performance as the speed varies.

Dynamic Yaw Rate Estimator

The yaw rate estimator can be improved by using a full order observer based on the bicycle model with yaw rate feedback, see FIG. 9. The bicycle model is written as:

$$\frac{d}{dt}\begin{bmatrix} V_y \\ r \end{bmatrix} = \underbrace{\begin{bmatrix} \frac{-(C_{af}+C_{ar})}{mV} & \frac{-(aC_{af}-bC_{ar})}{mV}-V \\ \frac{-(aC_{af}-bC_{ar})}{I_{zz}V} & \frac{-(a^2C_{af}-b^2C_{ar})}{I_{zz}V} \end{bmatrix}}_{A} \begin{bmatrix} V_y \\ r \end{bmatrix} + \underbrace{\begin{bmatrix} \frac{C_{af}}{m} \\ \frac{C_{ar}}{I_{zz}} \end{bmatrix}}_{B} \delta(t) \quad (1)$$

$$r_{meas} = \underbrace{[0 \; 1]}_{C} \begin{bmatrix} V_y \\ r \end{bmatrix} \quad (2)$$

The closed loop form of the estimator is written as:

$$\frac{d}{dt}\begin{bmatrix} \hat{V}_y \\ \hat{r} \end{bmatrix} = [A-GC]\begin{bmatrix} \hat{V}_y \\ \hat{r} \end{bmatrix} + B\delta(t) + Gr_{meas} \quad (3)$$

with G selected to place the poles of the estimator at locations 10 times faster than the open loop model. At first this seems unnecessary as the actual yaw rate of the vehicle is being used in an estimator to determine the yaw rate of the vehicle. It is true that at low yaw rates, the estimated and measured values will coincide. However, the estimator is based upon an entirely linear model, which becomes less accurate as the vehicle becomes more non-linear during increasing understeer. Hence when the vehicle starts to understeer, the estimated and actual yaw rates start to diverge causing an error that is used to change the assist torque value. The use of yaw rate feedback therefore reduces the susceptibility of the estimator to changes in dynamics with speed.

Experimentation has also shown that the estimator is robust to parameter change though this can be further improved by the use of lateral acceleration as an additional feedback signal.

Lateral Acceleration Estimation

FIG. 10 is a diagram corresponding to FIG. 9 but illustrating the case where the estimator is a lateral acceleration estimator block. The controller is substantially the same as for the yaw rate estimator but with the addition of the term D' from the lateral acceleration equation below.

The system is the same as for the dynamic estimator, only the inputs to the observer are steer angle and lateral acceleration (instead of yaw rate), and the output is an estimate of lateral acceleration, Equation 4. By subtracting the estimated lateral acceleration from the actual lateral acceleration, an error signal is generated that can be used in the same way as the yaw rate error signal of the first embodiment of FIG. 1

$$a_{y(meas)} = \underbrace{\begin{bmatrix} \frac{-(C_{af}+C_{ar})}{mV} & \frac{-(aC_{af}-bC_{ar})}{mV} \end{bmatrix}}_{C'} \begin{bmatrix} V_y \\ r \end{bmatrix} + \underbrace{\begin{bmatrix} \frac{C_{af}}{m} \end{bmatrix}}_{D'} \delta(t) \quad (4)$$

The state equation for the lateral acceleration observer is given by:

$$\frac{d}{dt}\begin{bmatrix} \hat{V}_y \\ \hat{r} \end{bmatrix} = [A-G'C']\begin{bmatrix} \hat{V}_y \\ \hat{r} \end{bmatrix} x + [B-G'D']\delta(t) + G'a_{y(meas)} \quad (5)$$

Reverse Detection

A preferred reverse detection algorithm is depicted in FIG. 11. The reverse flag is zero, indicating that the vehicle is reversing, when either yaw rate is in the deadzone, or they have different signs. The deadzones 40, 42 limit the effect of noise on the yaw rate signals. They are set such that for a stationary vehicle, the noise on the yaw rate does not exceed the deadzone. While the signal is in the deadzone, then the output of the block is zero. The sign blocks 44, 46 take the sign of the input signal. If the input signal is zero, then the sign value is also zero, otherwise it is plus if the input is positive or minus one if the input signal is negative. The saturation 48 is set so that if the input is 1 or greater, then the output is 1. If the input is zero or less, then the output is zero. This limits the reverse flag to 0 or 1. Reverse detection could equally well be achieved by comparison of estimated and actual lateral acceleration.

The yaw rate error, i.e., the difference between the yaw rate that the driver is demanding and the actual yaw rate of the vehicle, is found by subtracting the actual vehicle yaw rate from the estimated yaw rate as indicated in FIG. 8 at 50.

The Driver Torque Limit block limits the value of driver torque to pre-defined levels. As the amount of torque that the understeer control injects into the system is proportional to the driver torque, limits on the driver torque effectively place limits on the amount of torque that the system can inject.

Understeer Control

The understeer control comprises a number of sections as indicated in FIG. 12. The yaw rate error to scaling map 52 controls the steering feel, while the torque control 54 prevents excessive understeer torque, cancelling the assistance torque from the power steering, and even reversing the torque applied by the driver. Again, the control structure of FIG. 12 could equally well produce an understeer torque based upon a lateral acceleration error estimate.

Yaw Rate Error to Scaling Map

The input yaw rate error is used as the index input into a look-up table. The output of this look-up is the driver torque scaling. The elements of the look-up table are low for small yaw rate errors and large for high yaw rate errors as indicated in FIG. 13 (Yaw Rate Error to Driver Torque Scaling Look-up Table). Again, the principles of FIG. 13 could be applied equally to lateral acceleration error.

By varying the elements in the look-up table, the effect of the controller can be tuned to different vehicles and to give different performances. By making the transition from high to low occur at lower yaw rate errors, the steering feel can be made to go light well before the car reaches terminal understeer. If the torque scaling gain is made slightly negative initially, then the steering can be made to feel heavier at low yaw rates. This is very similar to an increase in driver torque in proportion to lateral acceleration.

Torque Control

It is possible for the understeer controller to generate a torque that is larger than the assist torque being generated by the power steering system. If this occurred, the torque felt by the driver would be reversed. Not only would this be uncomfortable and confusing, there would be the potential that the steering would wind on more lock instead of returning to straight ahead when the driver removed his hands. To prevent this torque reversal, the algorithm shown in FIG. 14 (block diagram of torque control section) has been constructed. This attempts to keep the driver torque above a predefined torque threshold which is achieved by comparing at 56 the actual driver torque with the torque threshold and generating a scaling between 0 and 1. By applying this scaling to the output of the understeer controller, the effects of the understeer controller can be controlled.

The algorithm is designed such that a scaling correction value is produced with the shape shown in FIG. 15 where $T_{threshold}$ is the torque value below which the driver torque should not fall and $k_{tune}$ is the value of tuning gain.

The scaling correction has 3 stages. In the first stage, the driver torque is very low and it is essential to quickly limit the effect of the understeer controller to prevent torque reversal. This is achieved by setting the scaling correction to zero, thereby nullifying the effect of the understeer controller. This is in effect a deadzone and is useful in dealing with noise from the torque sensor. The second stage is between some designed point and the torque threshold value. In this section, the output from the torque controller ramps linearly from 0 to 1 producing smooth control of the understeer controller output. The last section is where the driver torque is above the torque threshold. The scaling correction is one, therefore having no effect on the understeer controller output.

Torque Threshold

This block 58 is a constant equal to the level at which is it desired that the driver torque does not fall below. A satisfactory value has been found to be 1 Nm.

Max

The MAX blocks 60, 62 simply take the maximum value of their two inputs. In both cases they prevent the input falling below zero which could cause a negative scaling correction. This would provide a torque reversal at the driver, which would be highly undesirable as it would confusing for the driver.

Tuning Gain & Filter

The tuning gain and filter block 64 smooths the driver torque signal so that smoother control with less switching is produced. The tuning gain is used to control the size of the deadband as described by:

$$T_{deadbond} = \frac{T_{threshold} k_{tune} - 1}{k_{tune}}$$

Lateral Acceleration Control

Figure 16:
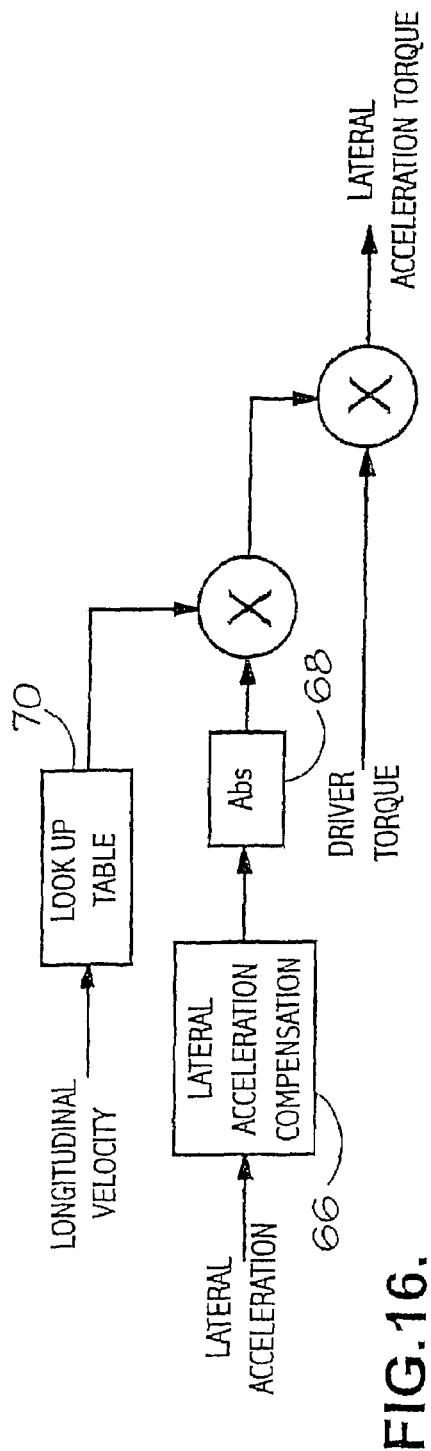
FIG. 16 illustrates lateral acceleration feel control.
Figure 17:
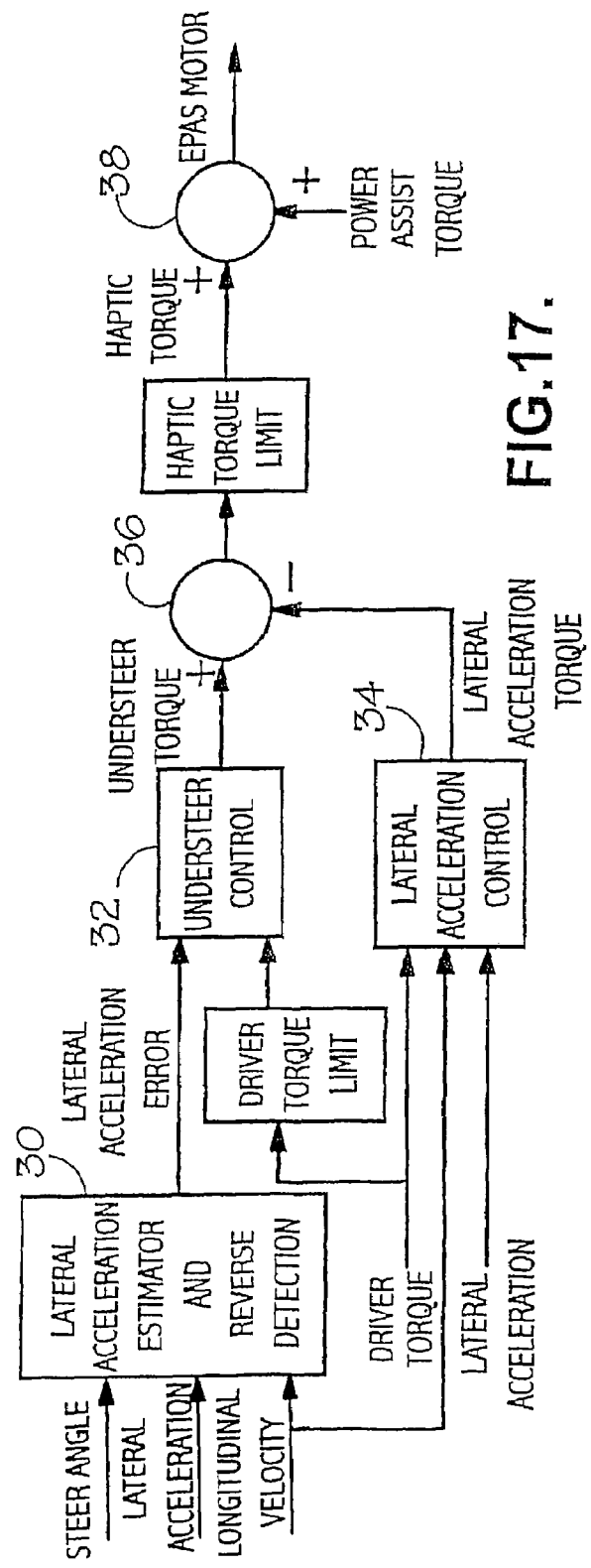
FIG. 17 is a block diagram of a further embodiment similar to FIG. 7 but with the yaw rate estimator replaced by a lateral acceleration estimator.

The lateral acceleration feel control, FIG. 16, is designed to produce a build up of torque in the steering system in proportion to the lateral acceleration of the vehicle.

Lateral Acceleration Compensation (66)

The lateral acceleration value supplied by a lateral acceleration sensor is passed through a compensation algorithm. This may simply be a filter to remove noise, or it may be a correction for the lateral acceleration sensor position. The best results are obtained if the lateral acceleration at the front axle is used. As the sensor is unlikely to be placed there, then the compensation element can be used to compensate for physical displacement of the sensor from a position mid way between the front wheels where the measured lateral acceleration would preferably be measured.

ABS (68)

The ABS block takes only the magnitude, thereby ensuring that the scaling is always positive and the lateral acceleration torque always has the same sign as the driver torque. If the relative signs were to change, then the steering feel would be confusing.

Look-Up Table (70)

The gain that is applied to that lateral acceleration is dependent on speed and is determined in the look-up table. At low speeds, the gain is zero, between around 10 and 40 kph the gain rises to a peak value and then remains at there at all higher speeds. A typical peak gain value is around 0.3.

Haptic Torque Limit

This is a saturation that prevents the haptic torque exceeding predefined limits. If it does exceed these limits, then it is simply held at the limit.

The major features of a preferred form of the Haptic Controller can be summarised as follows.

Torque Change in Understeer can be Artificially Introduced

If the steering system has been designed such that there is insufficient driver torque drop off when the vehicle is in understeer, then this can be added using information from other sensors on the vehicle.

Torque Build Up in Proportion to Lateral Acceleration can be Artificially Introduced If the steering system has been designed such that there is insufficient driver torque build up in proportion to lateral acceleration, then this can be added using information from other sensors on the vehicle.

Applied Torque is Proportional to Driver Torque

By making the torque applied by the controllers proportional to driver torque, passive vehicle performance is maintained. If the driver removes their hands from the handwheel, the driver torque falls to zero, the haptic controller torque also falls to zero and the handwheel self-centres.

Point of Application of Understeer Control is Entirely Tuneable.

The point at which the steering becomes light can be isolated from the vehicle. Therefore it is possible to provide for the steering becoming light slightly before terminal understeer, thereby providing the driver with advanced warning of a loss of traction.

Amount of Torque Drop Off in Understeer is Tuneable

The amount that the torque drops off in understeer is tuneable in software. Therefore it is simple to create a steering system that has a torque drop off characteristic that is suited to the vehicle.

Amount of Torque Build Up in Lateral Acceleration is Tunable

The amount that the torque builds up in proportion to lateral acceleration is tuneable in software. Therefore it is simple to create a steering system that has a torque drop off characteristic that is suited to the vehicle, including mapping it with speed to give a suitable low speed characteristic.

Lateral Acceleration can be Used Instead of Yaw Rate

The yaw rate signal can be substituted for a lateral acceleration signal, and the system will work in the same way with only a few changes to the estimator equations. This is advantageous as the cost of a lateral acceleration sensor is much less than a yaw rate sensor.

Algorithm Does Not Affect Steering Feel when Reversing

A simple algorithm detects when the vehicle is reversing based on the relative signs of the yaw rate and the yaw rate estimate. By preventing the controller acting when the vehicle is reversing, confusing changes in steering feel are avoided.

Minimal Additional Hardware

There are minimal additional hardware requirements beyond the base vehicle. One or more cheap lateral acceleration sensors may be all that is required.

GLOSSARY OF SYMBOLS

Parameters

| | Parameter |
|---|---|
| l | Wheel base |
| $V_{ch}$ | Vehicle characteristic speed |
| $G_s$ | Steering ratio |
| $C_{af}$ | Front tyre lateral stiffness (per axle) |
| $C_{ar}$ | Rear tyre lateral stiffness (per axle) |
| m | Vehicle mass |
| $I_{zz}$ | Vehicle yaw moment of inertia |
| a | Longitudinal distance from vehicle cog to front axle |
| b | Longitudinal distance from vehicle cog to rear axle |
| A | Bicycle model state transition matrix (2 × 2 matrix) |
| B | Bicycle model state input matrix (2 × 1 matrix) |
| C | Bicycle model state output matrix |

-continued

| | Parameter |
|---|---|
| G | Observer gain matrix (2 × 1 matrix) |
| D' | Alternative bicycle model output feedforward matrix (using lateral acceleration as a model output) |
| C' | Alternative bicycle model state output matrix (using lateral acceleration as a model output) |
| G' | Alternative observer gain matrix (using lateral acceleration as a model output). |

Signals

| | |
|---|---|
| $\hat{r}$ | Yaw rate estimate |
| $V_x$, V | Vehicle longitudinal velocity |
| $\delta_{sw}$ | Steer Angle (handwheel) |
| $V_y$ | Vehicle Lateral velocity |
| r | Vehicle yaw rate |
| t | Time |
| $\delta(t)$ | Steer Angle (road wheel) |
| $r_{meas}$ | Measured yaw rate |
| $\hat{V}_y$ | Estimated lateral velocity |
| $\hat{r}$ | Estimated vehicle yaw rate |
| $a_{y(meas)}$ | Measured lateral acceleration |

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A power assisted steering system for a motor driven vehicle, the system comprising:
    an assist torque signal generating means arranged to generate an assist torque signal for the steering system in response to the driver's applied torque and sensed vehicle speed and effective to decrease the driver's steering effort; and
    a means for generating a haptic torque based on vehicle lateral acceleration which is arranged to be subtracted from the torque assist signal such that when vehicle lateral acceleration builds up, corresponding to tighter cornering of the vehicle, the haptic torque subtracted from the torque assist signal increases the effective road reaction feedback sensed by the driver corresponding to the increase in cornering forces generated by the tyres of the vehicle.

2. A steering system according to claim 1, comprising a lateral acceleration control means which has inputs corresponding respectively to the driver's applied torque to the steering wheel, the longitudinal velocity of the vehicle and the measured lateral acceleration of the vehicle provided by a lateral acceleration sensor, and which outputs a lateral acceleration torque value.

3. A steering system according to claim 2, wherein the lateral acceleration control means comprises:

a lateral acceleration compensation means for the measured lateral acceleration, in the form of a compensation algorithm comprising one of a filter to remove noise and a means to correct for the physical position of the lateral acceleration sensor in the vehicle;

an Abs block which provides a scaling factor representative of the magnitude only of the lateral acceleration value provided by the lateral acceleration compensation means; and a look-up table which establishes a first gain dependent on vehicle longitudinal velocity which is applied to the magnitude value provided by the Abs block to provide a second gain, the driver's torque being modified by said second gain to form said lateral acceleration torque value.

4. A steering system according to claim 2, wherein the lateral acceleration torque value is further modified by a compensation means to form said haptic torque.

5. A steering system according to claim 4, wherein said compensation means provide a signal representative of understeer torque from which the lateral acceleration torque is subtracted to form said haptic torque.

6. A steering system according to claim 5, wherein the compensation means includes a dynamic estimator adapted to produce a dynamic error based on measured values of steer angle, vehicle dynamic rate and vehicle longitudinal velocity.

7. A steering system according to claim 6, wherein the dynamic estimator is a yaw rate estimator.

8. A steering system according to claim 7, including a reverse detection device for detecting whether the vehicle is reversing and comprising means for detecting when either the actual yaw rate or the estimated yaw rate lies in a deadzone, or they have different signs.

9. A steering system as claimed in claim 6, wherein the dynamic estimator is a lateral acceleration estimator.

10. A steering system as claimed in claim 9, including a reverse detection device for detecting whether the vehicle is reversing and comprising means for detecting when either the actual lateral acceleration or the estimated lateral acceleration lies in a deadzone, or they have different signs.

11. A steering system as claimed in claim 6, including an understeer control which produces said understeer torque from the dynamic error and a limited value of driver applied torque.

12. A steering system as claimed in claim 11, wherein the understeer control includes a torque control providing a scaling correction gain for correcting the dynamic error signal in dependence upon driver applied torque.

13. A steering system as claimed in claim 12, wherein the torque control is adapted to seek to keep the driver torque above a predefined torque threshold by comparing the actual driver torque with a torque threshold and generating a scaling between 0 and 1, the scaling being applied to the output of the understeer control.

14. A steering system according to claim 3, wherein the lateral acceleration torque value is further modified by a compensation means to form said haptic torque.

15. A steering system as claimed in claim 10, including an understeer control which produces said understeer torque from the dynamic error and a limited value of driver applied torque.

* * * * *